United States Patent [19]

Engelhardt et al.

[11] Patent Number: 4,507,440
[45] Date of Patent: Mar. 26, 1985

[54] CROSS-LINKABLE AND CROSS LINKED MACROMOLECULAR COMPOSITIONS WHEREIN CROSS-LINKING IS BY STRUCTURAL BRIDGES OF THE FORMULA —$NR^x$—CH=N—CO— AND THEIR PREPARATION

[75] Inventors: Friedrich Engelhardt, Frankfurt; Steffen Piesch, Oberursel; Juliane Balzer, Frankfurt, all of Fed. Rep. of Germany; Jeffery C. Dawson, Katy, Tex.

[73] Assignees: Cassella Aktiengesellschaft, Frankfurt am Main, Fed. Rep. of Germany; Dresser Industries, Inc., Dallas, Tex.

[21] Appl. No.: 399,682

[22] Filed: Jul. 19, 1982

Related U.S. Application Data

[63] Continuation of Ser. No. 216,672, Dec. 15, 1980, abandoned.

[51] Int. Cl.$^3$ .............................................. C08L 33/26
[52] U.S. Cl. ..................................... 525/218; 166/307; 166/308; 252/8.55 C; 524/501; 524/515; 524/516; 524/548; 524/555; 524/845; 525/201; 525/205; 525/209; 525/374
[58] Field of Search ............... 525/336, 161, 201, 205, 525/209, 218, 374, 329.4, 326.9; 166/307, 308; 524/501, 515, 516, 548, 555, 845; 252/8.55 C

[56] References Cited

U.S. PATENT DOCUMENTS

| | | | |
|---|---|---|---|
| 2,760,977 | 8/1956 | Feuer | 260/561 |
| 2,864,861 | 6/1956 | Wohusiedler et al. | 260/561 |
| 2,864,862 | 12/1958 | Sutherland et al. | 260/561 |
| 3,635,835 | 1/1972 | Peterson | 525/374 |
| 3,931,089 | 1/1976 | Karl | 260/29.6 HN |
| 3,934,651 | 1/1976 | Nierode et al. | 166/282 |
| 3,978,164 | 8/1976 | LeBoeuf et al. | 260/885 |
| 4,055,502 | 10/1977 | Swanson | 166/807 |
| 4,061,580 | 12/1977 | Jahnke | 252/8.55 |
| 4,079,011 | 3/1978 | Tate | 252/8.55 |
| 4,079,027 | 3/1978 | Phillips at al. | 260/29.4 UA |
| 4,088,584 | 5/1978 | Smalley et al. | 252/8.55 D |
| 4,098,987 | 7/1978 | Barua et al. | 526/304 |
| 4,100,079 | 7/1978 | Sinkovitz et al. | 252/8.55 |
| 4,107,057 | 8/1978 | Dill et al. | 252/8.55 |
| 4,144,179 | 3/1979 | Chatterji | 106/208 |
| 4,146,486 | 3/1979 | Hessert et al. | 252/8.55 C |
| 4,163,476 | 8/1979 | Tate | 166/271 |
| 4,163,727 | 8/1979 | Inks | 252/8.55 C |
| 4,219,429 | 8/1980 | Allen et al. | 166/307 |
| 4,309,523 | 1/1982 | Engelhardt | 526/240 |

FOREIGN PATENT DOCUMENTS

| | | |
|---|---|---|
| 0023712 | 2/1981 | European Pat. Off. . |
| 0044508 | 1/1982 | European Pat. Off. . |
| 482897 | 4/1938 | United Kingdom . |

OTHER PUBLICATIONS

Copolymerization, edited by George E. Ham, Interscience Publishers.
Kunststoff-Handbuch, vol. I, "Grundlagen", by Braun, pp.91–95, (1975).

*Primary Examiner*—Theodore E. Pertilla
*Attorney, Agent, or Firm*—Connolly and Hutz

[57] ABSTRACT

The present invention relates to macromolecular compositions crosslinked by a novel bridge having the formula —$NR^x$—CH=N—CO—. This novel bridge is obtained by reacting a macro-molecule, preferably a polymer, having at least two amidocarbonyl groups with a compound having at least two formylamido groups in an aqueous medium under highly acidic conditions. The crosslinking bridge formed by the reaction of this invention is produced in accord with the following formula:

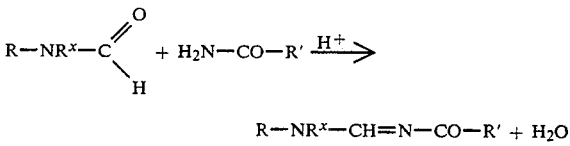

$$R-NR^x-CH=N-CO-R' + H_2O$$

Compositions containing macromolecules having at least two amidocarbonyl groups and a compound having at least two formylamido groups can act as viscosifying or gelling agents for aqueous acids where when added to aqueous acids, crosslinking occurs. Acids gelled in this manner have important use in the recovery of oil and natural gas from subterranean formations.

26 Claims, No Drawings

CROSS-LINKABLE AND CROSS LINKED MACROMOLECULAR COMPOSITIONS WHEREIN CROSS-LINKING IS BY STRUCTURAL BRIDGES OF THE FORMULA —NR$^x$—CH=N—CO— AND THEIR PREPARATION

This application is a continuation of application Ser. No. 216,672 filed Dec. 15, 1980 now abandoned.

The present invention relates to macromolecular compositions crosslinked by a novel bridge having the formula —NR$^x$—CH=N—CO—. This novel bridge is obtained by reacting a macro-molecule, preferably a polymer, having at least two amidocarbonyl groups with a compound having at least two formylamido groups in an aqueous medium under highly acidic conditions. The crosslinking bridge formed by the reaction of this invention is produced in accord with the following formula:

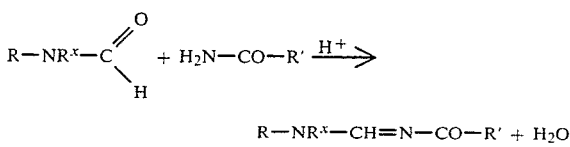

$$R-NR^x-CH=N-CO-R' + H_2O$$

Compositions containing macromolecules having at least two amidocarbonyl groups and a compound having at least two formylamido groups can act as viscosifying or gelling agents for aqueous acids where when added to aqueous acids, crosslinking occurs. Acids gelled in this manner have important use in the recovery of oil and natural gas from subterranean formations.

The art of well stimulation can employ a technique called fracture-acidizing to enhance the recovery of either oil or gas from subterranean carbonate formations. Carbonate formations include limestone, dolomites, or other reservoir rocks which contain calcarious material. Normally, fracture-acidizing involves the injection of an aqueous acid, which may or may not contain a proppant, into a wellbore at such a rate and pressure as to exceed the formation stresses thereby causing rock fatigue and inducing new fractures in the formation. Fractures are natural or induced cracks or channels in the formation matrix. Stimulation by this technique is achieved by allowing the acid to etch the fracture face. Since the face is a heterogeneous composition, the acid reaction rates will vary on the exposed surface. After the exerted pressure has been relieved, fracture closure will occur but the fracture face is no longer uniform and in most cases will not prefectly align due to the action of the acid. If a proppant is pumped with the acid, the acid will again preferentially act on the formation face. However, since the formation is heterogeneous, some areas of the face will be nonreactive to the acid. After fracture closure, the etched, non uniform localities of the face again will not align while areas not etched will be "propped" open by that proppant.

In each case, a more conductive channel is provided to allow the oil or gas to flow to the wellbore after the injection pressure is relieved. When an aqueous acid is injected into a wellbore in a fracture-acidizing application, it is often advantageous to use a viscosifying or gelling agent in the fluid (c.f. U.S. Pat. Nos. 3,415,319; 3,434,971; 3,749,169; 3,236,305 and 3,252,904). Viscous fluids possess several properties that are favorable to fracture acidizing. For example, the fluid viscosity is proportionally related to the created fracture volume and fracture width, therefore higher fluid viscosities will generate larger fracture volumes and fracture widths. In addition, viscous fluids decrease the rate of the acid etching on the formation allowing the acid to penetrate deeply into the fracture and viscous fluids serve as efficient proppant transporting media necessary to place proppant into the etched fracture.

Normally viscous fluids contain homo or copolymer compositions as the viscosifying agents. In particular, copolymer compositions containing amidocarbonyl pendent groups, such as polyacrylamide, ae commonly used as viscosifying agents in fracture acidizing fluids. Normally, low polymer concentrations, usually less than 1.0% by weight, are used. To enhance the viscosity of the fluid, it is known from German Offenlegungsschrift No. 2,657,443 that copolymers of acrylamide are readily crosslinked by the addition of aldehydes such as formaldehyde, acetaldehyde or glyoxal. The crosslinking reaction normally occurs at ambient temperatures in alkaline solutions or between 40° and 80° C. in acidic media. However, heating the fluid to initiate crosslinking and the time necessary to complete the crosslinking, sometimes in excess of 45 minutes, make this fluid impractical in fracture acidizing applications.

The present invention relates to new crosslinked polymer compositions wherein crosslinking is achieved by bridge members of the formula —NR$^x$—CH=N—CO, wherein R$^x$ represents hydrogen or alkyl having 1 to 4 carbon atoms or —CH$_2$OH. The invention also relates to mixtures of ingredients, one comprising macromolecules having at least two amidocarbonyl groups and another comprising a compound having at least two formylamido groups, said mixtures being suitable for reaction in an aqueous medium under highly acidic conditions to crosslink with the formation of the —NR$^x$—CH=N—CO—bridge. The invention further relates to methods of crosslinking such mixtures. The invention also relates to the use of the resulting crosslinked polymer compositions as viscosifiers for acids that do not have the disadvantages of the known polymers used for this purpose in fracture acidizing stimulation. While the new crosslinked polymer compositions of this invention have particular utility as viscosifiers in fracture acidizing stimulation, they may also be used whenever it is desired to increase the viscosity of aqueous acids such as in the art of metal cleaning.

The compositions according to the present invention when employed in acid fracturing have the advantage that little or no precipitants are formed in the acid environment as is typical of previously known gelling agents. Precipitants, if formed, tend to plug the underground formations and can severely limit the efficiency of the stimulation. In the present invention, if the crosslinked polymer composition degrades, the resulting polymer residues are soluble in the aqueous acid. This is because the crosslinking bridge decomposes leaving amino functions attached to the polymer backbone. These amino functions impart solubility to the polymer residues.

Crosslinkable mixtures of this invention preferably comprise:

(a) a water-soluble homo- or copolymer having amidocarbonyl groups and (b) a bis-acylamido-compound of the formula I

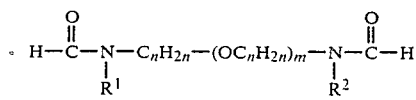 (I)

wherein
R$^1$ and R$^2$ represent hydrogen, alkyl having 1 to 4 carbon atoms or —CH$_2$OH,
n represents a number from 1 to 3 and
m represents a number from 0 to 1
or a water-soluble homo- or copolymer having formylamido groups of the formula

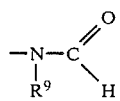

wherein R$^9$ stands for hydrogen or alkyl having 1 to 4 carbon atoms or CH$_2$OH. The crosslinkable mixtures may contain one or more of the components a together with one or more components b.

Component (a) of the crosslinkable mixtures of this invention and component (b) are present in a ratio by weight of from 1:0.2 to 1:20, preferably 1:0.2 to 1:1.

In general, the homo- or copolymer of component (a) prior to crosslinking may be any macromolecule, preferably a polymer, which is sufficiently soluble in water and contains in the polymer an amount of amidocarbonyl groups (at least two) sufficient to allow the formation of the novel crosslinking bridge, —NR$^x$—CH=N—CO—, in the macromolecule. Depending on which crosslinking agent is present in the compositions R$^x$ equals R$^1$, R$^2$ or R$^9$. The solubility in water should be not less than 10 g/l and the content of amidocarbonyl groups should be above 10% preferably above 15%, calculated on the weight of the macromolecule.

Particularly suitable homo- or copolymers of the component (a) prior to crosslinking comprise 50 to 100% by weight of entities of the formula II

 (II)

wherein R$^4$ stands for hydrogen or methyl and of 0 to 50% by weight of entities of the formula III

 (III)

wherein R$^5$ stands for hydrogen, alkyl having 1 to 3 carbon atoms, hydrogen and methyl being preferred, and Y stands for formylamido; N-substituted formylamido where the N-substituent is methyl or hydroxy methyl, cyano, carboxyl or its alkali, or ammonium salts; the alkoxycarbonyl group having 1 to 6, preferably 1 to 3 carbon atoms; the hydroxy-alkoxycarbonyl group having 1 to 3 carbon atoms; the N-methylolamidocarbonyl group HOCH$_2$NH—CO—, the methylol group of which may optionally be etherified with alkanols having 1 to 4 carbon atoms; the alkanoylamino group having 1 to 4 carbon atoms which may optionally be N-substituted with methylol or alkyl having 1 to 4 carbon atoms; pyrrolidonyl-(1); phenyl; pyridinium; the sulfonic acid group; the sulfoalkylamidocarbonyl group having 1 to 4 carbon atoms; the phosphonic acid group; it being possible for sulfonic and phosphonic acid groups to occur as alkali or ammonium salts; for a radical of the formula IV

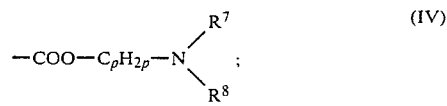 (IV)

or for a radical of the formula V

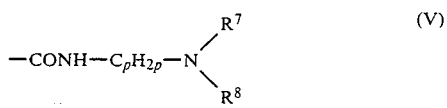 (V)

and the quaternized compounds of (IV) and (V) quaternized with CH$_3$—Cl or dimethyl sulfate, wherein R$^7$ and R$^8$ are the same or different and stand for alkyl having 1 to 4, preferably 1 or 2; carbon atoms and p represents a number from 1 to 4.

Preferred homo- or copolymers of component (a) prior to crosslinking comprise 60 to 85% by weight of entities of the formula II and 15 to 40% by weight of entities of the formula III.

Furthermore, it is preferable to use as component (a) homo- or copolymers in which R$^5$ signifies hydrogen or methyl and Y signifies the carboxyl group, the sulfonic acid group, 3-sulfo-2-methyl-propyl-(2)-amidocarbonyl of the formula

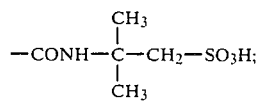

an alkanoylamino group having 1 to 4 carbon atoms which may optionally be N-substituted with methylol or alkyl having 1 to 4 carbon atoms, pyrrolidonyl-(1) or a radical of the formulas IV and V given and defined above, where each acid group can also occur as Na—, K— or NH$_4$—salt.

From among the group of compositions of this invention prior to crosslinking containing a bis-acylamido compound of the formula I those are preferred which contain a compound of the formula I wherein R$^1$ and R$^2$ represent hydrogen or —CH$_2$OH, and n represents the number 1.

It is possible to use as homo- or copolymer of component (b) prior to crosslinking any polymer that is sufficiently soluble in water, i.e. not less than 10 g/l which in addition to formylamido groups also has an amount of amidocarbonyl groups sufficient to give stable crosslinked polymers of the novel chemical structure. Stated differently, it is possible that component (a) and component (b) each contains the required amounts of amidocarbonyl and formylamido groups. Indeed, component (a) and component (b) may be the same. Self-crosslinkable copolymers of this special class are described in a concurrently filed application entitled "Water-soluble Copolymers" in the names of Friedrich Engelhardt, Klaus Kühlein, Ulrich Riegel, Sigmar P. Von Halasz, Jeffrey C. Dawson and Anthony R. Reed, the contents of which are hereby incorporated by reference and are to be considered an integral part of this disclosure.

Component (b) must contain a sufficient amount of formylamido groups to form the desired crosslink bridge. A sufficient amount of formylamido groups should not be less than 1 gram mole of formylamido group (i.e., 71 grams of N-vinyl formamide) per 500 grams of the polymer.

Particularly suitable homo- or copolymers of the component (b) prior to crosslinking comprise 50 to 100% by weight of entities of the formula VI

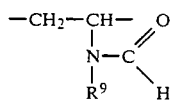

wherein $R^9$ stands for hydrogen, methyl or hydroxymethyl, hydrogen and methyl being preferred, and of 0 to 50% by weight of entities of the formula VII

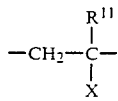

wherein $R^{11}$ stands for hydrogen or methyl and X stands for cyano; the carboxyl group or its alkali or ammonium salts; the alkoxycarbonyl group having 1 to 6, preferably 1 to 3 carbon atoms; the hydroxy-alkoxycarbonyl group having 1 to 3 carbon atoms; the amidocarbonyl group, the N-methylolamidocarbonyl group $HOCH_2NH-CO-$, the methylol group of which may optionally be etherified with alkanols having 1 to 4 carbon atoms; an alkanoylamino group having 1 to 4 carbon atoms which may optionally be N-substituted with methylol or alkyl having 1 to 4 carbon atoms; pyrrolidonyl-(1); phenyl; pyridinium; the sulfonic acid group, a sulfoalkylamidocarbonyl group having 1 to 4 carbon atoms; the phosphonic acid group; it being possible for sulfonic and phosphonic acid groups to occur as alkali or ammonium salts; for a radical of the formula VIII

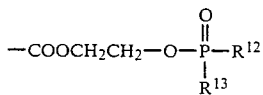

wherein $R^{12}$ and $R^{13}$ are the same or different and stand for alkyl having 1 to 4, preferably 1 or 2 carbon atoms; for a radical of the formula IX

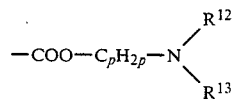

wherein $R^{12}$ and $R^{13}$ have the meanings given above and p represents a number from 1 to 4; or for a radical of the formula X

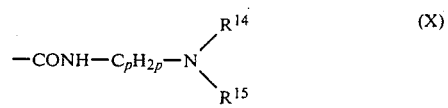

and the quaternized compounds of (IX) and (X) quaternized with $CH_3OCl$ or dimethyl sulfate, hwerein $R^{14}$ and $R^{15}$ are the same or different and stand for alkyl having 1 to 4, preferably 1 or 2 carbon atoms and p has the meaning given above.

Preferred homo- or copolymers of the component (b) prior to crosslinking comprise 60 to 95% by weight of entities of the formula (VI) and 5 to 40% by weight of entities of the formula (VII).

Furthermore, it is preferable to use as component (b) prior to crosslinking homo- or copolymers in which X signifies the carboxyl group, the sulfonic acid group, 3-sulfo-2-methyl-propyl-(2)-amidocarbonyl of the formula

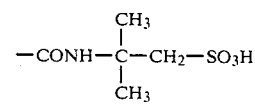

an alkanoylamino group having 1 to 4 carbon atoms which may optionally be N-substituted with methylol or alkyl having 1 to 4 carbon atoms, pyrrolidonyl-(1) or a radical of the formulas IX and X given and defined above, where each acid group can also occur as $Na-$, $K-$ or $NH_4-salt$.

Preferably, copolymers are used as components (a) and (b) prior to crosslinking having K-values of from 15 to 300 (cf. Fikentscher "Cellulosechemie" Vol 13, page 58 (1932)).

It stands to reason that the copolymers may contain several different radicals X and Y respectively. As a rule, the radicals X and Y when present in a single macromolecule have not more than 3, preferably 2, different meanings. Copolymers of this kind are prepared using several different comonomers carrying a radical X and Y respectively, as a rule not more than 3, preferably 2.

The homo- or copolymer compositions of this invention prior to crosslinking are readily soluble in water to give solutions of a medium degree of viscosity. Hence, these solutions can be handled easily. The compositions prior to crosslinking retain this property unless they are treated with acids at a pH of 3 or below. Unlike the known polymer-aldehyde combinations, the compositions of this invention are storable for an unlimited period of time. Acids are used to induce the novel crosslinking reaction between the amidocarbonyl groups of component (a) and the formylamido groups of component (b) which results in a drastic rise in viscosity due to the formation of $-NR^x-CH=N-CO-$linkages forming a three dimensional novel polymer network according to this invention. This is why these compositions are used to increase the viscosity of acids. Depending upon the amount of the composition added, the viscosity may be varied within a wide range. The lower limit of this range is the viscosity of the pure acid free from copolymers. If, on the other hand, a sufficient amount of a composition of this invention is added, gels of the novel cross linked polymer composition may be obtained which do not flow spontaneously but keep any shape given to them. Between these extremes any viscosity may be obtained by varying the composition contents of the acid.

In fracture-acidizing applications, the concentration of the acrylamido homo or copolymer (component a) usually ranges from 0.24% to 0.72% by weight on total fracturing or treating fluid depending of the polymer properties, well treating conditions or reservoir characteristics. The crosslinking agent (component b) will have a concentration range from 0.05% to 1%, preferably 0.25% to 0.6%, based on total weight of the fracturing or treating fluid. The acrylamido homo or copolymers are introduced into the aqueous phase as a fine solid powder, a hydrocarbon dispersion containing 20% to 50% by weight of component a, or as an oil in water or water in oil emulsion normally containing 20% to 50% by weight of component a. The preferred system is an emulsion containing the highest possible percentage of component a to produce a stable emulsion, normally 35% to 75% by weight. Suitable oils useful in such water in oil emulsions include normal or branched paraffinic hydrocarbons having a boiling point of 150° C. to 250° C.

The crosslinking agents (component b) are normally introduced as aqueous solutions containing up to 50% by weight of crosslinking agent, a fine solid powder, a hydrocarbon dispersion containing 20% to 50% by weight of crosslinking agent or water in oil or oil in water emulsions containing 20% to 50% by weight of crosslinking agent. The preferred state would be as an aqueous solution containing 50% by weight active crosslinking agent.

When the preferred concentration of acrylamido homo or copolymer, 0.24% to 0.72%, and preferred concentration of the crosslinking compositions of this invention, 0.25% to 0.5%, are placed together in water, only a medium viscosity is obtained. A Fann 35 viscometer at a shear rate of 511 sec$^{-1}$ will indicate a viscosity between 20 and 60 centipoise. The compositions will retain this viscosity until they are treated with a Bronsted-Lowery acid. The acids are used to induce the crosslinking reaction between the acrylamido homo or copolymer and the formylamido compositions leading to the new crosslinked polymers of this invention by the formation of linkages according to the following chemical structure —NR$^x$—CH═N—CO— producing a drastic rise in viscosity usually exceeding 300 cps at a shear rate of 511 sec$^{-1}$ on a Fann 35 viscometer.

The normal method of preparing the novel acid gel according to this invention is to add the preferred concentration of acrylamido homo or copolymer to an acidic solution allowing the polymer to hydrate for usually 3 min. to 45 min. Generally, any acid or aqueous acid solution may be thickened according to the present invention. In fracture-acidizing applications, acid strengths normal range from ¼% to 28% by weight of either hydrochloric, acetic or formic acid. The preferred strength is 3% to 15% depending on the well treating conditions and reservoir characteristics. After 90% of the viscosity from the hydrating polymer has been obtained, the acidic solution is treated with the preferred concentration of crosslinking agent, 0.25% to 0.5% by weight, a substantial increase in viscosity occurs according to the formation of the new crosslinked polymer. It stands to reason that any other way of combining the components of this invention with the acrylamido homo or copolymer and the acid likewise yields acid gels or highly viscous acid preparations.

The viscosity of the acid thickened with the compositions of this invention is maintained at room temperature for long periods of time, e.g., exceeding 3 months. At elevated temperatures, e.g., above 50° C., preferably above 80° C., the viscosity diminishes and the highly viscous, gelled acids turn to liquids of low viscosity.

This change is due to a hydrolytical degradation of the novel three dimensional crosslinked polymer to linear polymer chains. The time necessary for the change from the gel to the liquid state depends, to a certain extent, on the composition of the polymer molecule and hence, may be varied within certain limits, but not exceeding 12 hours, by selection of appropriate monomer compounds and monomer ratios.

Generally, any acid or aqueous acid solution may be thickened according to the present invention by forming the novel crosslinked three dimensional polymer. Acids being solid at normal temperatures, e.g., aromatic sulfonic acids, have to be used as aqueous solutions. Preferred acids are those which are normally liquid and, with respect to economical use in the field of oil recovery, are strong and inexpensive. Hence in the first place, inorganic and strong lower organic acids are taken into consideration.

Examples of acids which may be thickened according to this invention are hydrochloric acid, sulfuric acid, nitric acid, perchloric acid, phosphoric acid, formic acid, acetic acid, monochloroacetic acid, dichloroacetic acid and trichloroacetic acid.

Preferred acids for oil recovering pruposes are hydrochloric acid, formic acid and acetic acid.

The homo or copolymers of the component (a) prior to crosslinking are produced by (co-)polymerizing 50 to 100%, preferably 60 to 85% by weight of acrylamide or methacrylamide and 0 to 50%, preferably 15 to 40% by weight of a comonomer of the formula IIIa

wherein R$^5$ and Y have the meanings given above.

Monomers having the formula (IIIa) and suitable for copolymerization with acrylamide or methacrylamide include the following:

| R$^5$ | —H | —CH$_3$ | —H | —CH$_3$ | —H | —H |
|---|---|---|---|---|---|---|
| Y | —CN | —CN | —COOH⊕ | —COOH⊕ | —COOCH$_3$ | —NH—CHO |

| R$^5$ | —CH$_3$ | —H | —CH$_3$ | —H | —CH$_3$ |
|---|---|---|---|---|---|
| Y | —COOCH$_3$ | —COOC$_2$H$_5$ | —COOC$_2$H$_5$ | —COOC$_4$H$_9$ | —COOC$_4$H$_9$ |

| R$^5$ | —H | —H | —CH$_3$ | —H | —CH$_3$ |
|---|---|---|---|---|---|
| Y | —COOC$_6$H$_{13}$ | —COOC$_2$H$_4$OH | —COOC$_2$H$_4$OH | —COOC$_3$H$_6$OH | —COOC$_3$H$_6$OH |

| R$^5$ | —H | —CH$_3$ | —H | —CH$_3$ |
|---|---|---|---|---|
| Y | —CONHCH$_2$OH | —CONHCH$_2$OH | —CONHCH$_2$OCH$_3$ | —CONHCH$_2$OCH$_3$ |

-continued
| $R^5$ | —H | —CH₃ | —H |
|---|---|---|---|
| Y | —CONHCH₂OC₂H₅ | —CONHCH₂OC₂H₅ | —CONHCH₂OC₄H₉ |
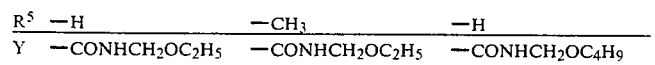
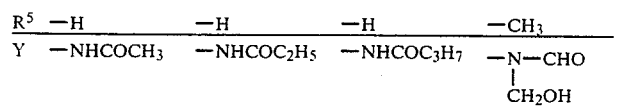
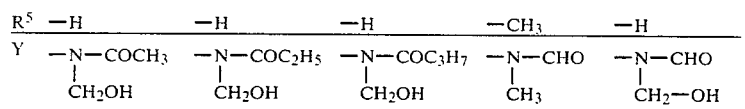
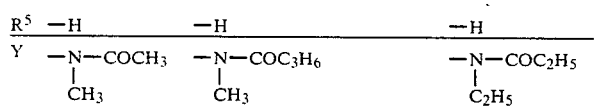
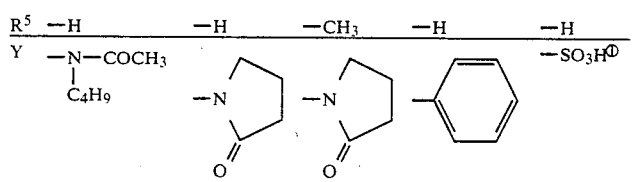
| $R^5$ | —CH₃ | —H | —CH₃ |
|---|---|---|---|
| Y | —SO₃H⊕ | —PO₃H₂⊕ | —PO₃H₂⊕ |
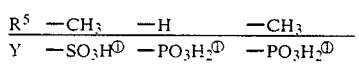
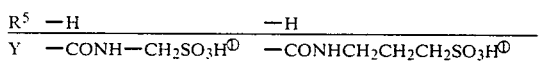
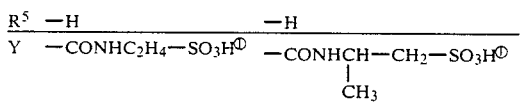
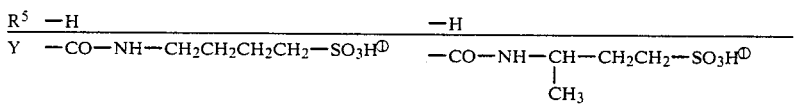
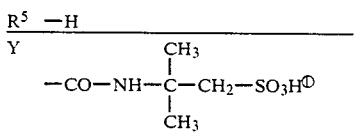
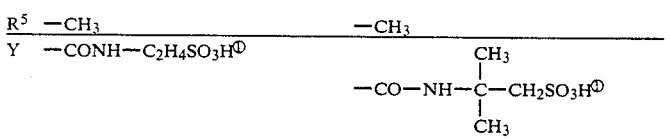
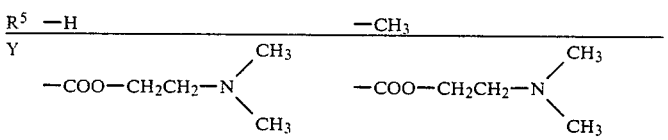
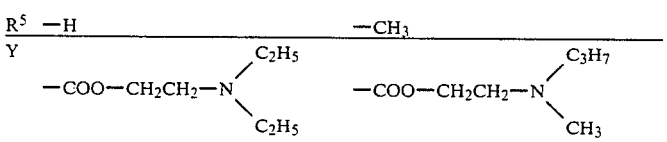
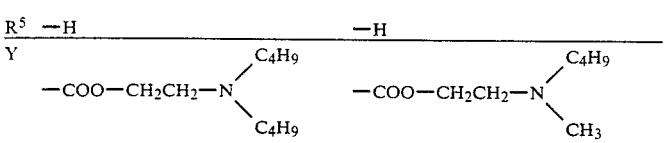

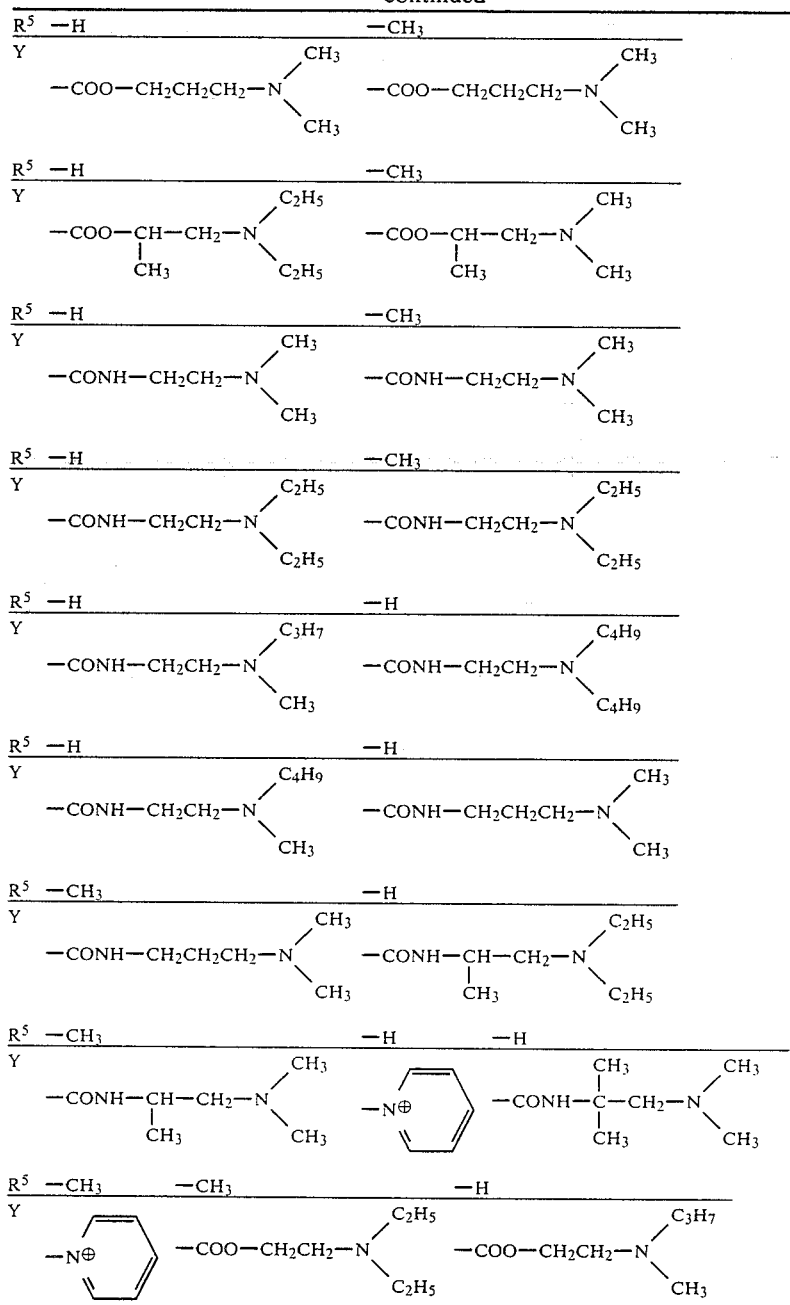

[1]Since N—vinyl amides are not stable under acidic conditions, reaction mixtures containing acidic substances must be neutralized prior to the polymerization such as with the above mentioned basic comonomers.

The homo or copolymers of the component (b) prior to cross-linking are produced by (co-)polymerizing 50 to 100%, preferably 60 to 95% by weight of a monomer having the formula VIa:

$$CH_2=CH-N(R^9)-C(=O)H \quad (VIa)$$

wherein $R^9$ has the meaning given above and 0 to 50%, preferably 5 to 40% by weight of a comonomer of the formula VIIa:

$$CH_2=C(R^{11})-X \quad (VIIa)$$

wherein $R^{11}$ and X have the meanings given above.

Monomers having the formula (VIa) and suitable for the production of homopolymers of component b or copolymerization with monomers of the formula VIIa to form copolymers of component b are N-vinyl-formamide, N-vinyl-N-methyl-formamide and N-vinyl-N-hydroxymethyl-formamide. Monomers having the formula VIIa include acrylamide and the monomers illustrated above for formula IIIa.

Crosslinking of component a may also be achieved by employing compounds of formula I as a crosslinking agent. Specific compounds of the formula I include the following species:

| $R^1$ | $R^2$ | n | m |
|---|---|---|---|
| H | H | 1 | 0 |
| H | H | 1 | 1 |
| $CH_3$ | $CH_3$ | 1 | 0 |
| $CH_3$ | $CH_3$ | 1 | 1 |
| $C_2H_5$ | $C_2H_5$ | 1 | 0 |
| $C_2H_5$ | $C_2H_5$ | 1 | 1 |
| $C_3H_7$ | $C_3H_7$ | 1 | 0 |
| $C_4H_9$ | $C_4H_9$ | 1 | 0 |
| $C_4H_9$ | $CH_3$ | 1 | 0 |
| $C_3H_7$ | $C_2H_5$ | 1 | 0 |
| H | H | 2 | 0 |
| $CH_3$ | $CH_3$ | 2 | 0 |
| H | H | 2 | 1 |
| $CH_3$ | $CH_3$ | 2 | 1 |
| $C_2H_5$ | $C_2H_5$ | 2 | 0 |
| $C_3H_7$ | $C_3H_7$ | 2 | 0 |
| H | H | 3 | 0 |
| $CH_3$ | $CH_3$ | 3 | 0 |
| H | H | 3 | 1 |
| $C_2H_5$ | $C_2H_5$ | 3 | 0 |
| $C_3H_7$ | $C_3H_7$ | 3 | 0 |

Preferred compounds of formula I are:

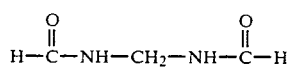

(Methylene-bis-formamide) and

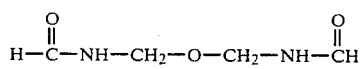

(Bis-(N-formyl-aminomethyl)ether).

The compounds of formula I can easily be produced according to British Pat. No. 1,410,722.

If copolymers having several different radicals Y and X in components a and b respectively are desired, several different comonomers of the formula IIIa and VIIa respectively are used in the copolymerization, as a rule 3 or preferably 2.

The polymerization to produce components a or b may be performed according to any known polymerizing process. When one of the monomers is a vinyl-formamide monomer, a pH range from 6 to 12, preferably 7 to 9 should be employed.

To adjust the pH value, alkaline reacting salts of alkali metals, e.g., alkalicarbonates, alkalihydrogencarbonates, alkaliborates, di- or trialkaliphosphates, alkalihydroxides, ammonia or organic amines of the formula $NR_3^{16}$ are used, wherein $R^{16}$ is hydrogen, alkyl having 1 to 4 carbon atoms or hydroxyethyl whereby at least one of the radicals $R^{16}$ is different from hydrogen. Preferred bases for adjusting the pH value are the alkali compounds mentioned above, especially sodium hydroxide, potassium hydroxide, sodium carbonate and hydrogen carbonate, potassium carbonate and hydrogen carbonate and sodium- and potassium borates. Another preferred base is $NH_3$.

The polymerization reaction can be initiated by energetic electromagnetic or corpuscular radiation or by all substances which form radicals. Accordingly, possible polymerization initiators are organic per-compounds such as, for example, benzoyl peroxide, alkyl hydroperoxides, such as, for example, butyl hydroperoxide, cumene hydroperoxide, p-menthane hydroperoxide, dialkyl peroxides, such as di-tert.-butyl peroxide, or inorganic per-compounds such as, for example, potassium, sodium or ammonium persulfate and hydrogen peroxide, and azo compounds such as, for example, azobisisobutyronitrile, 2,2′ azobis(2-amidinopropane)hydrochloride or azobisisobutyramide. It is advantageous to employ the organic or inorganic percompounds in combination with reducing agents. Examples of suitable reducing agents are sodium pyrosulphite, sodium bisulphite or condensation products of formaldehyde with sulphoxylates. The polymerization reaction can be carried out particularly advantageously using Mannich adducts of sulphinic acids, aldehydes and amino compounds, such as are described in German Pat. No. 1,301,566.

It is known furthermore to add to the polymerization batches small amounts of moderators, which harmonize the course of the reaction by flattening the reaction rate/time diagram, improve the reproducibility of the reaction and hence lead to uniform products with extremely little variation in quality. Examples of suitable moderators of this type are nitrilo-trispropionylamide or hydrohalides of monoalkylamines, dialkylamines or trialkylamines, such as, for example, dibutylamine hydrochloride. In manufacturing the copolymers of the invention, such compounds can also be present with advantage.

Furthermore, so-called regulators can be added to the polymerization batches, that is to say compounds which influence the molecular weight of the polymers formed. Usable known regulators are, for example, alcohols such as methanol, ethanol, propanol, isopropanol, n-butanol, sec.-butanol and amyl alcohol, alkylmercaptans such as dodecylmercaptan and tert.-dodecylmercaptan, isooctyl thioglycolate, and some halogen compounds, such as carbon tetrachloride, chloroform and methylene chloride.

As usual, the polymerization is carried out in an atmosphere of protective gas, preferably nitrogen.

The reaction may be performed in solution, in emulsion or under the conditions of precipitative polymerization at a temperature of from 20° to 120° C., preferably from 40° to 100° C.

If water is used as a solvent for the reaction, the polymerization is run in solution and a viscous, aqueous solution of the (co-)polymerizates is obtained. The product can be isolated either by distilling off the water from the solution or by mixing the aqueous solution with organic solvents miscible with water, whereby the (co-)polymer precipitates and can be separated from the liquid phase, e.g., by filtration.

It is preferred, however, to use the aqueous solution of the (co-)polymer obtained directly, optionally after having adjusted a certain desired concentration.

If (co-)polymerizing is performed in an organic solvent, as for instance in a lower alkanol, preferably, e.g., in tert. butanol, the reaction runs under the conditions of precipitative polymerization. In this case, the (co-)polymer formed precipitates from the starting solution as a solid compound during the course of the reaction. It can be easily isolated in the usual manner, e.g., by filtration under suction and drying the filter residue. Of course, it is also possible, and sometimes preferred, to distill off the organic solvent.

The following working examples demonstrate the use of compositions according to the invention for the production of high-viscous acid compositions, especially acid gels. Further illustrative working examples of the preparation of the polymers of component b, as well as polymers of component a where Y is formylamido, can be found in the aforesaid application of Engelhardt et al. entitled "Water Soluble Copolymers".

The abbreviations used in the examples and in the included tables have the following meanings:

| | |
|---|---|
| AM: | acrylamide |
| VMA: | N—vinyl-N—methylacetamide |
| AMPS: | 2-acrylamido-2-methylpropane sulfonic acid where the exponent 1 signifies the ammonium salt, 2 signifies the salt with dimethyl-$\beta$-hydroxyl-ethylamine, |
| AS: | acrylic acid |
| MAS: | methacrylic acid |
| NMA: | N—methylol-acrylamide |
| VSSNa: | sodium salt to vinylsulfonic acid |
| NMVA: | N—methylol-vinylacetamide |
| VA: | vinylacetamide |
| VF: | vinylformamide |
| NMVF: | N—methylol-vinylformamide |
| VPA: | vinylphosphonic acid |
| A: | ammoniumperoxidisulfate |
| B: | a conbination of ammoniumperoxidisulfate + dibutyl-ammonium hydrochloride + |

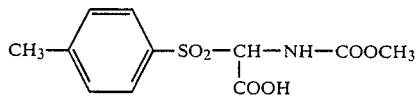

| | |
|---|---|
| C: | azo-isobutylronitrile |
| VIP: | vinylpyrrolidone. |

EXAMPLE 1

(a) To 100 g of a 1% by weight aqueous solution of a copolymer of 80% by weight of acrylamide, 15% by weight of AMPS and 5% by weight of vinylpyrrolidone (K=201) 5 g of N-methylene-bis-formamide are added. The clear, slightly viscous solution thus obtained is stable and storable for an unlimited period of time. Upon mixing this solution with 100 ml of concentrated hydrochloric acid the viscosity rises rapidly and within 30 minutes a gel is formed. At ordinary temperatures of 20° to 25° C. the acid gel does practically not change its property over a period of more than 15 days. At 80° to 90° C., however, the gel degrades within 20 minutes to give a slightly yellowish brown, clear liquid of low viscosity. The copolymer used in this Example can be produced as follows:

(b) 600 ml of deionised water are first introduced into a 2 l polymerisation vessel equipped with a stirrer, thermometer, gas inlet tube, dropping funnel and heating bath, and the following monomers are then introduced, while stirring the mixture and passing a slight stream of nitrogen through it:
80 g of acrylamide,
15 g of AMPS and
5 g of vinylpyrrolidone.

Thereafter 0.5 g of azodiisobutyronitrile is added and the temperature of the reaction mixture is brought to 50° C. by means of a heating bath. One ml of a 10% solution of benzoyl peroxide in acetone is then added to cause the polymerisation to commence, with a rise in temperature and in viscosity, a maximum temperature of 58° C. being reached.

After completion of the reaction, the mixture is stirred for a further hour at 80° C. The highly viscous polymer mass is now diluted to 1% strength by adding water, while stirring.

(c) Gels of similar properties are obtained if the copolymer used above is replaced by a copolymer of 55% by weight of acrylamide, 40% by weight of AMPS and 5% by weight of vinyl-methylacetamide (K=165) or with a copolymer of 60% by weight of acrylamide, 35% by weight of AMPS and 5% of vinyl-methyl-acetamide (K=179).

EXAMPLE 2

To a 3.5% by weight aqueous solution of a copolymer of 70% by weight of acrylamide, 10% by weight of AMPS, 15% by weight of vinylformamide and 5% by weight of vinylpyrrolidone (K-value=152) was admixed, with stirring, 1% by weight of N-methylene-bis-formamide. The clear solution obtained was storable without change for an unlimited period of time. Upon adding thereto the same volume of concentrated hydrochloric acid there was obtained, within a period of 20 minutes an acid gel which does not alter its state within a 10 day's period at 20° to 25° C. At 80° to 90° C., however, the gel "fuses" within 20 minutes to give a clear liquid of low viscosity. Acid gels of similar behavior may be obtained if the copolymer used in this Example is replaced by the copolymers given in the following table:

| AM | AMPS | | $\eta$/rel. | k-value |
|---|---|---|---|---|
| 60 | 20 | 20 VIP | | |
| 55 | 20 | 25 VIP | | |
| 60 | 20 | 20 VIP | 39.46 | 215 |
| 60 | 20 | 20 VIP | 30.3 | 206 |
| 70 | 10 | 20 VIP | 32.6 | 208 |

All amounts given in this table are parts by weight.

EXAMPLE 3

To 100 ml of a 1% by weight aqueous solution of a copolymer of 65% by weight of acrylamide and 35% by weight of sodium acrylate (K=203) 100 ml of concentrated hydrochloric acid are added. The strongly acidic mixture obtained represents a slightly viscous liquid which can be stored unchanged for an unlimited period of time. Upon adding to it 0.5% by weight of methylene-bis-formamide, a gel stable in shape is formed within a period of 10 minutes. At 20° to 25° C. the acid gel remains unchanged for at least 12 days, while at 80° to 90° C. a clear liquid of low viscosity is formed within 30 minutes. A similar acid gel may be produced if the methylene-bis-formamide used above is replaced by the same amount of a compound having the formula

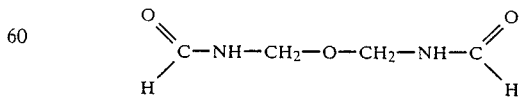

The aqueous polymer solution used can be obtained by adding, under vigorous stirring, 2.6 ml of a copolymer emulsion produced as described below, into 97.5 ml of water.

The copolymer emulsion is produced as follows:

1.85 g of sorbitan monostearate are dissolved in 30 g of a technical isomeric hydrocarbon solvent having a boiling range of from 200° to 240° C.

The solution is introduced into a 2-liter reaction vessel fitted with a mechanical stirrer, thermometer and gas inlet for nitrogen. A solution of monomers is produced by dissolving 33.9 g of acrylamide and 18.2 g of acrylic acid in 50 ml of deionized water and the pH-value of the mixture is adjusted to 8.5 by adding a 20% aqueous solution of sodium hydroxide. Then the aqueous monomeric solution is slowly added to the organic sorbitan monostearate solution while vigorously stirring and the air in the reaction vessel is replaced by nitrogen.

0.07 g of 2,2'-Azobis-iso-butyronitrile, dissolved in acetone, are added to the emulsion of the monomers and then the reaction vessel is gently heated to 60° C. while stirring. The polymerising reaction was finished within 2.5 hours resulting in a stable 39% by weight strength emulsion of the copolymer having a K value of 203.

EXAMPLE 4

1% by weight aqueous solution of a copolymer of 90% acrylamide and 10% of dimethylaminoethyl-methacrylate (used for polymerising as the acetate) containing 5% by weight of N-methylene-bis-forma-mide was mixed, at a volume ratio of 1:1, with concentrated hydrochloric acid which results in an acid gel within 10 minutes. At 20° to 30° C., the gel obtained remains unchanged for more than 8 days but collapses to give a clear liquid of low viscosity at 80° to 90° C.

Replacement of the N-methylene-bis-formamide by the same amount of a compound having the formula

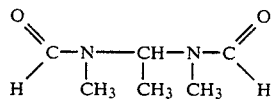

leads to a similar result.

The aqueous polymer solution used can be obtained by adding, under vigorous stirring, 4.8 g of a copolymer emulsion produced as described below, into 95.2 ml of water and subsequent addition to 5 g of N-methylene-bis-formamide.

The copolymer emulsion is produced as follows:

185.0 g of a mixture of 84% strength saturated aliphatic hydrocarbons and 16% strength naphthenic hydrocarbons (boiling point of the mixture: 192° to 254° C.), 188.3 g of a chloroalkane having a chlorine content of 66.5 and a density of 1.575 kg/m³ and 32 g of sorbitan monooleate are mixed in a vessel equipped with a stirrer, a thermometer and a nitrogen inlet and outlet.

After having well intermixed the constituents, a solution of 180 g of acrylamide and 20 g of dimethylamino-ethyl-methacrylate-acetate in 387.5 parts of water is added and the aqueous phase is emulsified in the organic phase. Nitrogen is allowed to pass through the mixture for 30 minutes, which is then heated within 15 minutes to a temperature of 60° C. At this temperature a solution of 0.212 parts of 2,2'-azo-bis-isobutyronitrile is a slight amount of acetone is added. After having heated the mixture to 60° C. for 3 hours, the polymerization is complete. A dispersion is obtained which does not clot, is safe against sedimentation, has a viscosity of 710 m Pa sec. at 29.3 sec⁻¹ and contains a polymer having a K value of 201. Polymer contents: 20.8%.

EXAMPLE 5

(a) 1.85 g of sorbitan monostearate are dissolved in 28 g of Isopar M, a technical isomeric hydrocarbon solvent having a boiling range of from 200° to 240° C., sold by Exxon Corporation. The solution is introduced into a 2-liter reaction vessel fitted with a mechanical stirrer, thermometer and gas inlet for nitrogen. A solution of monomers is produced by dissolving 33.9 g of acrylamide and 2.4 g of acrylic acid in 40 ml of deionized water, and the pH-value of the mixture is adjusted to 8.5 by adding a 20% aqueous solution of sodiumhydroxide. Then the aqueous monomeric solution is slowly added to the organic sorbitan monosterate solution while vigorously stirring and the air in the reaction vessel is replaced by nitrogen. 0.07 g of 2,2'-azobis-iso-butyronitrile, dissolved in acetone, are added to the emulsion of the monomers and then the reaction vessel is gently heated to 60° C. while stirring. The polymerising reaction was finished within 2.5 hours resulting in a stable emulsion of the copolymer.

(b) 67 g of Isopar M are introduced into a 1-liter polymerization flask and heated to a temperature of 60° C., with weak stirring, 0.27 g of sorbitan monolaurate, 1.3 g of sorbitan monostearate, 0.17 g of sorbitan monooleate and 4.3 g of polyoxyethylene sorbitan monostearate being successively added and dissolved. With further weak stirring a stream of nitrogen is passed into the solution and the temperature is adjusted to 60° C. 94 ml of water are given into a separate vessel and 2.4 g of AMPS, 10.0 g of VIMA, 10.0 g of vinyl pyrrolidone and 10.6 g of N-vinyl formamide are added and dissolved while stirring. This solution is adjusted to a pH-value of 8 to 10 by the dropwise addition of 10% strength aqueous solution of sodium hydroxide, 0.1 g of ammonium persulfate being subsequently added. This monomeric solution is then emulsified in the organic phase via a dropping funnel in the reaction flask, with rapid stirring. The polymerization reaction starts after approx. 30 minutes, which is recognizable by a rise in the temperature. In the course of 15 minutes the reaction temperature rises to 80°–90° C. The polymerizing reaction having faded out, the solution is heated for another two hours at 80° C. A stable emulsion having a polymeric content of 30 percent by weight is obtained. The molecular weight of the polymer is The two emulsions obtained under items (a) and (b) of this Example are intermixed and thoroughly homogenised by vigorously stirring the mixture of 5 Minutes. The copolymer composition thus obtained has a copolymer content of about 27% and represents a highly active, valuable thickening agent for aqueous acids.

EXAMPLE 8

(a) 185.0 parts of a mixture of 84% strength saturated aliphatic hydrocarbons and 16% strength naphthenic hydrocarbons (boiling point of the mixture: 192° to 254° C.), 188.3 parts of a chloroalkane having a chlorine content of 66.5 and a density of 1.575 kg/m³ and 32 parts of sorbitan monooleate are mixed in a vessel equipped with a stirrer, a thermometer and a nitrogen inlet and outlet.

After having well intermixed the constituents, a solution of 212.5 parts of acrylamide in 387.5 parts of water is added and the aqueous phase is emulsified in the organic phase. Nitrogen is allowed to pass through the mixture for 30 minutes, which is then heated within 15 minutes to a temperature of 60° C. At this temperature a solution of 0.212 parts of 2,2′-azo-bis-isobutyronitrile in a slight amount of acetone is added. After having heated the mixture to 60° C. for 3 hours, the polymerization is complete.

A dispersion is obtained which does not clot, is safe against sedimentation, has a viscosity of 710 m Pa sec. at 29.3 sec$^{-1}$ and contains a polymer having a K value of 201.

(b) 150 g of Exsol D, a deodorized kerosene boiling between 190° to 240° C., sold by Esso Chemie of Germany, are introduced into a 1-liter polymerization flask and heated to a temperature of 60° C., with weak stirring, 1.3 g of sorbitan monolaurate, 6.5 g of sorbitan monostearate, 0.8 g of sorbitan monooleate and 22 g of polyoxyethlene sorbitan monostearate being successively added and dissolved. With further weak stirring a stream of nitrogen is passed into the solution and the temperature is adjusted to 60° C. 150 ml of water are given into a separate vessel and 30 g of AMPS, 45 g of vinyl pyrrolidone and 55 g of N-vinyl formamide are added and dissolved while stirring. This solution is adjusted to a pH value of 8 to 10 by the dropwise addition of 10% strength aqueous solution of sodium hydroxide, 0.3 g of ammonium persulfate being subsequently added. This monomeric solution is then emulsified in the organic phase via a dropping funnel in the reaction flask, with rapid stirring. The polymerization reaction starts after approx. 30 minutes, which is recognizable by a rise in the temperature. In the course of 15 minutes the reaction temperature rises to 80°-90° C. The polymerizing reaction having faded out, the solution is heated for another two hours at 80° C. A stable emulsion having a polymeric content of 30% by weight is obtained. The molecular weight of the polymer is 95,000. The two emulsions obtained under items (a) and (b) of this example are intermixed and thoroughly homogenised by vigorously stirring the mixture for 5 minutes. The copolymer compositions thus obtained has a copolymer content of bout 27% and represents a highly active, valuable thickening agent for aqueous acids.

EXAMPLE 7

A gas well in West Texas is selected to fracture-acidize. The well has production interval from a depth of 9,650 to 9,740 feet. At this interval, the bottom hole static temperature is 170° F. while the formation permeability averaged 0.1 md. The well productivity prior to treatment is 4 MCF/day and 5 barrels of condensate by natural flow.

The fracture-acidizing fluid is prepared by blending 40,000 gallons of a 15% hydrochloric acid solution containing 80 gallons, 0.2% by weight, of a common corrosion inhibitor with 1,600 pounds (40 lb per 1000 gallons) of a fine powdered (100-120 mesh) copolymer. The copolymer contains 55% by weight acrylamide, 40% by weight of AMPS and 5% by weight of N-methyl-N-vinyl acetamide (K=165). In addition, 80 gallons, 0.2% by weight, of a nonionic fluorosurfactant is also blended into the treating fluid. After one hour of storage in two frac tanks, a low viscosity fluid (~35 cps at 511 sec$^{-1}$ on a Fann 35) is obtained. Upon injection of the fluid into the well bore, the aqueous crosslinking solution containing 50% by weight of active polymer from a composition of 80% N-vinyl formamide, 10% acrylic acid and 10% N-vinylpyrrolidone is added at a rate of 4 gallons per 1000 gallons of treating fluid. The injection rate is 12 barrels per minute at a surface treating pressure of 6000 psi. After approximately 85 minutes, the well is shut-in for 6 hours to allow the acid to react. After this time, the well head pressure is relieved and the well is placed back into a flowing status. The well productivity is tested and found to be significantly improved.

In its broadest aspects, highly viscous acid preparations or acid gels of the present invention may contain from 70 to 99.8% by weight of one or more of the aforementioned acids and 0.2 to 30% by weight of the crosslinked polymer composition having characteristic —NR$^x$—CH=N—CO— bridges. It is generally preferred that substantially all (at least 50% and preferably at least 70%) crosslink bridges have the aforesaid formula. Other known crosslink bridges may also appear in the final product depending upon the presence of other moieties in components (a) or (b) and/or the addition of known crosslinking agents reactive with such moieties As stated earlier, the amidocarbonyl groups of component (a) are carried on macromolecules. This is because the macromolecule seems to stablize the resulting bridge. Where the molecule to which the amidocarbonyl groups are attached is of insufficient size, no or only a small number of desired bridges are stabilized, and the bridges appear to be degraded to formic acid, ammonium ion, amine, carboxylic acid and possibly other degradation products by hydrolytic action.

We claim:

1. A composition crosslinkable in an aqueous acidic medium comprising a compound having at least two formylamido groups and a polymer having at least two amidocarbonyl groups, the formylamido group and the amidocarbonyl group of said compound and polymer reacting in the aqueous acidic medium to form crosslink bridges of structural units of the formula —NR$^x$—CH=N—CO—, wherein R$^x$ represents hydrogen, alkyl having 1 to 4 carbon atoms or —CH$_2$OH.

2. A crosslinkable, water-soluble composition according to claim 1 comprising:
    A. a water-soluble homo- or copolymer having amidocarbonyl groups in an amount of more that 10%, calculated on the weight of the polymer and
    B. a member selected from the group consisting of (a) a bis-acylamido-compound of the formula I

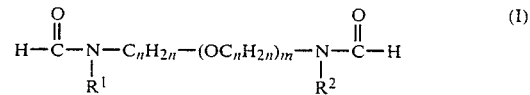

wherein
R$^1$ and R$^2$ represent hydrogen, alkyl having 1 to 4 carbon atoms or —CH$_2$OH,
n represents a number from 1 to 3 and
m represents a number from 0 or to 1, and
(b) a water soluble homo- or copolymer having formylamido groups of the formula

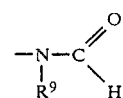

wherein R$^9$ stands for hydrogen or alkyl having 1 to 4 carbon atoms or —CH$_2$OH, the amount of formylamido groups being not less than 1 mol per 500 g of the polymer.

3. A crosslinkable, water-soluble composition according to claim 2 wherein component A comprises 50 to 100% by weight of entities of the formula II

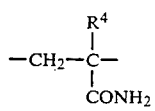 (II)

wherein $R^4$ stands for hydrogen or methyl and of 0 to 50% by weight of entities of the formula III

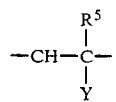 (III)

wherein $R^5$ stands for hydrogen, alkyl having 1 to 3 carbon atoms, and Y stands for formylamido; N-substituted formylamido where the N-substituent is methyl or hydroxy methyl; cyano; carboxyl; the alkali or ammonium salts of carboxyl; the alkoxycarbonyl group having 1 to 6 carbon atoms; the hydroxy-alkoxycarbonyl group having 1 to 3 carbon atoms; the N-methylolamidocarbonyl group $HOCH_2NH—CO—$; the N-methylolamidocarbonyl group wherein the methylol group is etherified with alkanols having 1 to 4 carbon atoms; the mono- or dialkylamino group having altogether 1 to 8 carbon atoms in the alkyl radicals; the alkanoylamino group having 1 to 4 carbon atoms; the alkanoylamino group having 1 to 4 carbon atoms which is N-substituted with methylol or alkyl having 1 to 4 carbon atoms; pyrrolidonyl-(1); phenyl; pyridinium; the sulfonic acid group; the sulfoalkylamidocarbonyl group having 1 to 4 carbon atoms; the phosphonic acid group; the alkali or ammonium salts of said sulfonic acids and phosphonic acid groups; a radical of the formula IV

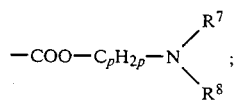 (IV)

a radical of the formula V

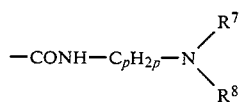 (V)

wherein $R^7$ and $R^8$ are the same or different and stand for alkyl having 1 to 4 carbon atoms and p represents a number from 1 to 4, or quaternary salts of formulas IV and V.

4. A crosslinkable, water-soluble composition according to claim 2 wherein components (A) and (B) are present in a ratio by weight of from 1:0.2 to 1:20.

5. A crosslinkable, water-soluble composition according to claim 1 comprising a water-soluble homo- or copolymer having amidocarbonyl groups and a water-soluble homo- or copolymer having formylamido groups of the formula

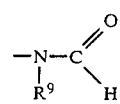

wherein $R^9$ is hydrogen or alkyl having 1 to 5 carbon atoms.

6. A crosslinkable, water-soluble composition according to claim 1 wherein the polymer having formylamido groups is a homopolymer of vinyl formamide.

7. A crosslinked polymer composition obtained by reacting in a highly acidic aqueous medium pendant amidocarbonyl groups of the formula $—CONH_2$ of component (A) with formylamido groups of component (B), component (A) comprising a water-soluble homo- or copolymer having amidocarbonyl groups in an amount of more than 10%, calculated on the weight of the polymer and component (B) comprising a member selected from the group consisting of (a) a bis-acylamido-compound of the formula I

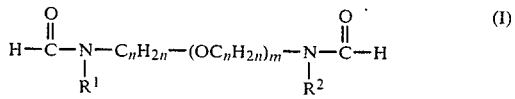 (I)

wherein
$R^1$ and $R^2$ represent hydrogen, alkyl having 1 to 4 carbon atoms or $—CH_2OH$,
n represents a number from 1 to 3 and
m represents a number from 0 to 1, and (b) a water-soluble homo- or copolymer having formylamido groups of the formula

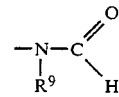

wherein $R^9$ stands for hydrogen or alkyl having 1 to 4 carbon atoms or $—CH_2OH$, the amount of formylamido groups being not less than 1 mol per 500 g of the polymer.

8. A crosslinked polymer composition according to claim 7 wherein component (A) comprises 50 to 100% by weight of entities of the formula II

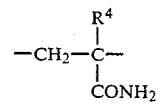 (II)

wherein $R^4$ stands for hydrogen or methyl and of 0 to 50% by weight of entities of the formula III

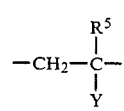 (III)

wherein
$R^5$ stands for hydrogen, alkyl having 1 to 3 carbon atoms and
Y stands for formylamido; N-substituted formylamido where the N-substituent is methyl or hydroxymethyl; cyano; carboxyl; or the alkali or ammonium salts of carboxyl; the alkoxycarbonyl group having 1 to 6 carbon atoms; the hydroxyalkoxycarbonyl group having 1 to 3 carbon atoms; the N-methylolamidocarbonyl group HOCH$_2$NH—CO—; the N-methylolamidocarbonyl group wherein the methylol group is etherified with alkanols having 1 to 4 carbon atoms; the mono- or dialkylamino group having altogether 1 to 8 carbon atoms in the alkyl radicals; the alkanoylamino group having 1 to 4 carbon atoms; the alkanoylamino group having 1 to 4 carbon atoms which is N-substituted with methylol or alkyl having 1 to 4 carbon atoms; pyrrolidonyl-(1); phenyl; pyridinium; the sulfonic acid group; the sulfoalkylamidocarbonyl group having 1 to 4 carbon atoms; the phosphonic acid group; the alkali or ammonium salts of said sulfonic acids and phosphonic acid groups; a radical of the formula IV

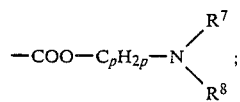

a radical of the formula V

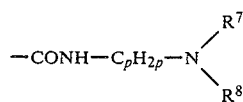

wherein $R^7$ and $R^8$ are the same or different and stand for alkyl having 1 to 4 carbon atoms and p represents a number from 1 to 4; or quaternary salts of formulas IV and V.

9. A crosslinked polymer composition according to claim 7 or claim 8 wherein component (B) comprises 50 to 100% by weight of entities of the formula VI

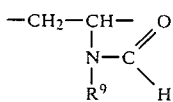

wherein $R^9$ stands for hydrogen, methyl or hydroxy methyl and of 0 to 50% by weight of entities of the formula VII

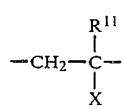

wherein
$R^{11}$ stands for hydrogen or methyl and
X stands for cyano; the carboxyl group; the alkali or ammonium salts of carboxyl; the alkoxycarbonyl group having 1 to 6 carbon atoms; the hydroxyalkoxycarbonyl group having 1 to 3 carbon atoms; the N-methylolamidocarbonyl group HOCH$_2$NH—CO—; the N-methylolamidocarbonyl group wherein the methylol group is etherified with alkanols having 1 to 4 carbon atoms; the alkanoylamino group having 1 to 4 carbon atoms; the alkanoylamino group having 1 to 4 carbon atoms which is N-substituted with methylol or alkyl having 1 to 4 carbon atoms; pyrrolidonyl-(1); phenyl; pyridinium; the sulfonic acid group; a sulfoalkylamidocarbonyl group having 1 to 4 carbon atoms; the phosphonic acid group; the alkali or ammonium salts of said sulfonic acids and phosphonic acid groups; a radical of the formula VIII

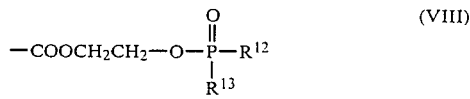

wherein $R^{12}$ and $R^{13}$ are the same or different and stand for alkyl having 1 to 4 carbon atoms; a radical of the formula IX

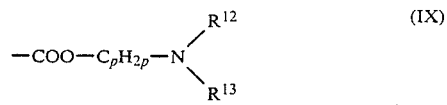

wherein p represents a number from 1 to 4; a radical of the formula X

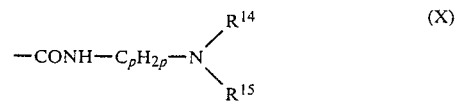

wherein $R^{14}$ and $R^{15}$ are the same or different and stand for alkyl having 1 to 4 carbon atoms quaternary salts of formula IX and X.

10. A crosslinked, polymer composition according to claim 7 wherein components (A) and (B) are present in a ratio by weight of from 1:0.2 to 1:20.

11. A crosslinked, polymer composition according to claim 7 wherein component (A) is a water-soluble homo- or copolymer having pendant amidocarbonyl groups of the formula —CONH$_2$ and component (B) is a bis-acylamide-compound of the formula I

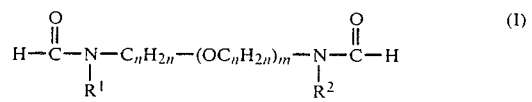

wherein $R^1$ and $R^2$ are hydrogen, alkyl having 1 to 4 carbon atoms or CH$_2$OH.

12. A crosslinked, polymer composition according to claim 11 wherein component (B) is methylene-bis-formamide or bis-(N-formyl-aminomethyl)ether.

13. A crosslinked polymer composition according to claim 7 wherein component (A) is a water-soluble homo- or copolymer having pendant amidocarbonyl groups of the formula CONH$_2$ and component (B) is a water-soluble homo- or copolymer having formylamide groups of the formula

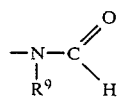

wherein $R^9$ is hydrogen or alkyl having 1 to 4 carbon atoms or —CH$_2$OH.

14. A crosslinked, polymer composition according to claim 7 wherein component (B) is a homopolymer of vinyl formamide.

15. A method of forming a crosslinked composition having crosslink bridges of structural units of the formula $-NR^x-CH=N-CO-$ comprising reacting a compound having at least two formylamido groups with a polymer having at least two amidocarbonyl groups in an aqueous acidic medium.

16. A method of forming a crosslinked composition which comprises reacting in a highly acidic aqueous medium pendant amidocarbonyl groups of the formula $-CONH_2$ of component (A) with formylamido groups of component (B), component (A) comprising a water-soluble homo- or copolymer having amidocarbonyl groups in an amount of more than 10%, calculated on the weight of the polymer and component (B) comprising a member selected from the group consisting of (a) a bis-acylamido-compound of the formula I

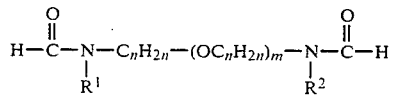

wherein
R$^1$ and R$^2$ represent hydrogen, alkyl having 1 to 4 carbon atoms or $-CH_2OH$,
n represents a number from 1 to 3 and
m represents a number from 0 to 1 and
(b) a water-soluble homo- or copolymer having formylamido groups of the formula

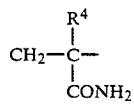

wherein R$^9$ stands for hydrogen or alkyl having 1 to 4 carbon atoms or $-CH_2OH$ the amount of formylamido groups being not less than 1 mol per 500 g of the polymer.

17. A method according to claim 16 wherein component (A) comprises 50 to 100% by weight of entities of the formula II

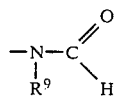

wherein R$^4$ stands for hydrogen or methyl and of 0 to 50% by weight of entities of the formula III

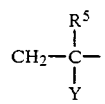

wherein R$^5$ stands for hydrogen, alkyl having 1 to 3 carbon atoms and Y stands for formylamido; N-substituted formylamido where the N-substituent is methyl or hydroxy methyl; cyano; carboxyl; or the alkali or amonium salts of carboxyl; the alkoxycarbonyl group having 1 to 6 carbon atoms; the hydroxy-alkoxycarbonyl group having 1 to 3 carbon atoms; the N-methylolamidocarbonyl group HOCH$_2$NH—CO—; the N-methylolamidocarbonyl group wherein the methylol group is etherified with alkanols having 1 to 4 carbon atoms; the mono- or dialkylamino groups having altogether 1 to 8 carbon atoms; the alkanoylamino group having 1 to 4 carbon atoms, the alkanoylamino group having 1 to 4 carbon atoms which is N-substituted with methylol or alkyl having 1 to 4 carbon atoms, pyrrolidonyl-(1); phenyl; pyridinium; the sulfonic acid group; the sulfoalkylamidocarbonyl group having 1 to 4 carbon atoms; the phosphonic acid group; the alkyl or ammonium salts of said sulfonic acids and phosphonic acid groups, a radical of the formula IV

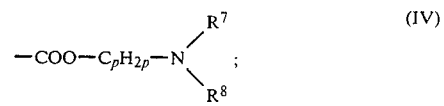

a radical of the formula V

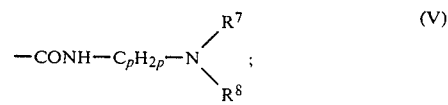

wherein R$^7$ and R$^8$ are the same or different and stand for alkyl having 1 to 4 carbon atoms and p represents a number from 1 to 4; or quaternary salts of formulas IV and V.

18. A method according to claim 16 wherein component (B) comprises 50 to 100% by weight of entities of the formula VI

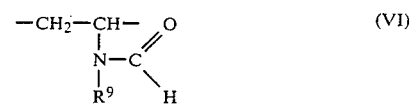

wherein R$^9$ stands for hydrogen, methyl or hydroxyl methyl and of 0 to 50% by weight of entities of the formula VII

wherein
R$^{11}$ stands for hydrogen or methyl and
X stands for cyano; the carboxyl group; the alkali or ammonium salts of carboxyl; the alkoxy carbonyl group having 1 to 6 carbon atoms; the hydroxy-alkoxycarbonyl group having 1 to 3 carbon atoms, the N-methylolamidocarbonyl group HOCH$_2$NH—CO—; the N-methylolamidocarbonyl group wherein the methylol group is etherified with alkanols having 1 to 4 carbon atoms; the alkanoylamino group having 1 to 4 carbon atoms; the alkanoylamino group having 1 to 4 carbon atoms which is N-substituted with methylol or alkyl having 1 to 4 carbon atoms; pyrrolidonyl-(1); phenyl; pyridinium; the sulfonic acid group; a sulfoalkylamidocarbonyl group having 1 to 4 carbon atoms; the phosphonic acid group; the alkali or ammonium salts of said sulfonic acids and phosphonic acid groups; a radical of the formula VIII

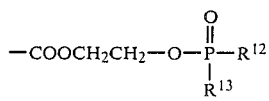

(VIII)

wherein $R^{12}$ and $R^{13}$ are the same or different and stand for alkyl having 1 to 4 carbon atoms; a radical of the formula IX

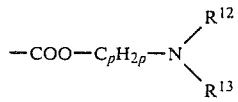

(IX)

wherein p represents a number from 1 to 4; a radical of the formula X

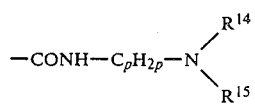

(X)

wherein $R^{14}$ and $R^{15}$ are the same or different and stand for alkyl having 1 to 4 carbon atoms; or quaternary salts of formulas IX and X.

19. A method according to claim 16 wherein component (A) is a water-soluble homo- or copolymer having pendant amido=carbonyl groups of the formula —CONH$_2$ and component (B) is a bis-acylamide-compound of the formula I

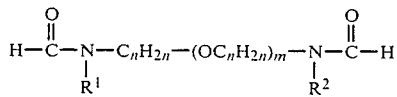

(I)

wherein $R^1$ and $R^2$ are hydrogen, alkyl having 1 to 4 carbon atoms or CH$_2$OH.

20. A method according to claim 16 wherein component (A) is a water-soluble homo- or copolymer having pendant amidocarbonyl groups of the formula —CONH$_2$ and component (B) is a water-soluble homo- or copolymer having formylamide groups of the formula

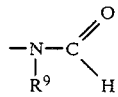

wherein $R^9$ is hydrogen or alkyl having 1 to 4 carbon atoms or —CH$_2$OH.

21. A crosslinkable, water-soluble composition comprising:
(A) a water-soluble homo- or copolymer having pendant amidocarbonyl groups of the formula —CONH$_2$ in an amount of more than 10%, calculated on the weight of the polymer and
(B) a water-soluble homo- or copolymer having 50 to 100% by weight of formylamido entities of the formula VI

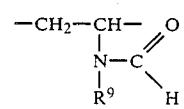

(VI)

wherein $R^9$ stands for hydrogen, methyl or hydroxy methyl and of 0 to 50% by weight of entities of the formula VII

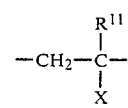

(VII)

wherein
$R^{11}$ stands for hydrogen or methyl and
X stands for cyano; the carboxyl group; the alkali or ammonium salts of carboxyl; the alkoxy carbonyl group having 1 to 6 carbon atoms; the hydroxyalkoxycarbonyl group having 1 to 3 carbon atoms; the N-methylolamidocarbonyl group HOCH$_2$NH—CO—; the N-methylolamidocarbonyl group wherein the methylol group is etherified with alkanols having 1 to 4 carbon atoms; the alkanoylamino group having 1 to 4 carbon atoms; the alkanoylamino group having 1 to 4 carbon atoms which is N-substituted with methylol or alkyl having 1 to 4 carbon atoms; pyrrolidonyl-(1); phenyl; pyridinium; the sulfonic acid group; a sulfoalkylamidocarbonyl group having 1 to 4 carbon atoms; the phosphonic acid group; the alkali or ammonium salts of said sulfonic acids and phosphonic acid groups; a radical of the formula VIII

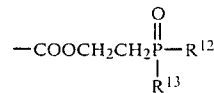

(VIII)

wherein $R^{12}$ and $R^{13}$ are the same or different and stand for alkyl having 1 to 4; a radical of the formula IX

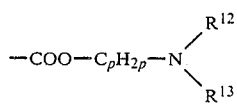

(IX)

wherein p represents a number from 1 to 3; a radical of the formula X

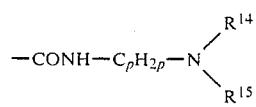

(X)

wherein $R^{14}$ and $R^{15}$ are the same or different and stand for alkyl having 1 to 4 carbon atoms; or quaternary salts of formulas IX and X.

22. A crosslinkable, water-soluble composition according to claim 21 wherein component (A) comprises 50 to 100% by weight of entities of the formula II

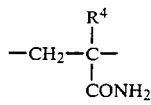

(II)

wherein $R^4$ stands for hydrogen or methyl and of 0 to 50% by weight of entities of the formula III

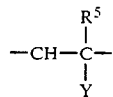

(III)

wherein $R^5$ stands for hydrogen, alkyl having 1 to 3 carbon atoms, and

Y stands for formylamido; N-substituted formylamido where the N-substituent is methyl or hydroxy methyl; cyano; carboxyl; the alkali or ammonium salts of carboxyl; the alkoxycarbonyl group having 1 to 6 carbon atoms; the hydroxyalkoxycarbonyl group having 1 to 3 carbon atoms; the N-methylolamidocarbonyl group HOCH$_2$NH—CO—; the N-methylolamidocarbonyl group wherein the methylol group is etherified with alkanols having 1 to 4 carbon atoms; the mono- or dialkylamino group having altogether 1 to 8 carbon atoms in the alkyl radicals; the alkanoylamino group having 1 to 4 carbon atoms; the alkanoylamino group having 1 to 4 carbon atoms which is N-substituted with methylol or alkyl having 1 to 4 carbon atoms; pyrrolidonyl-(1); phenyl; pyridinium; the sulfonic acid group, the sulfoalkylamidocarbonyl group having 1 to 4 carbon atoms; the phosphonic acid group; the alkali or ammonium salts of said sulfonic acids and phosphonic acid groups; a radical of the formula IV

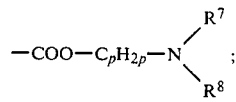

(IV)

a radical of the formula V

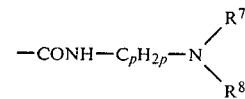

(V)

wherein $R^7$ and $R^8$ are the same or different and stand for alkyl having 1 to 4 carbon atoms and p represents a number from 1 to 3; or quaternary salts of formulas IV and V.

23. A cross-linkable, water-soluble composition according to claim 1 wherein component (B) comprises a bis-acylamide compound of the formula (I)

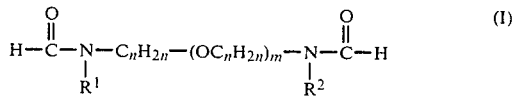

(I)

wherein $R^1$ and $R^2$ are hydrogen, alkyl having 1 to 4 carbon atoms or —CH$_2$OH and wherein n represents a number from 1 to 3 and m represents a number from 0 to 1.

24. A crosslinkable, water-soluble composition according to claim 23 where the compound of formula I is methylene-bis-formamide or bis-(N-formylaminomethyl)ether.

25. A crosslinked polymer composition comprising a homo- or copolymer chain of acrylamide or methacrylamide crosslinked to a second compound to form a polymer network wherein the crosslink bridges have the formula —NR$^x$—CH=N—CO— wherein R$^x$ represents hydrogen, alkyl having 1 to 4 carbon atoms or —CH$_2$OH.

26. A crosslinked composition according to claim 25 wherein crosslink bridges of the formula —NR$^x$—CH=N—CO— are formed by the reaction in an aqueous acidic medium of a compound having at least two formylamido groups with a homo- or copolymer having at least two amidocarbonyl groups.

* * * * *